United States Patent [19]

Casey et al.

[11] Patent Number: 5,224,000
[45] Date of Patent: Jun. 29, 1993

[54] CRASH STOP AND MAGNETIC LATCH FOR A VOICE COIL ACTUATOR

[75] Inventors: Shawn E. Casey, San Jose; Terence H. West, Aptos, both of Calif.

[73] Assignee: Seagate Technology, Inc., Scotts Valley, Calif.

[21] Appl. No.: 974,675

[22] Filed: Nov. 12, 1992

Related U.S. Application Data

[63] Continuation of Ser. No. 563,424, Aug. 7, 1990, abandoned, which is a continuation of Ser. No. 454,191, Dec. 21, 1989, Pat. No. 4,947,274, which is a continuation of Ser. No. 220,329, Jul. 18, 1988, Pat. No. 4,890,176.

[51] Int. Cl.⁵ .............................. G11B 5/54
[52] U.S. Cl. .............................. 360/105
[58] Field of Search .......................... 360/105

[56] References Cited

U.S. PATENT DOCUMENTS

| | | | |
|---|---|---|---|
| 4,594,627 | 6/1986 | Viskochil | 360/105 |
| 4,890,176 | 12/1989 | Casey | 360/105 |
| 4,947,274 | 8/1990 | Casey | 360/105 |

*Primary Examiner*—A. J. Heinz
*Attorney, Agent, or Firm*—Flehr, Hohbach, Test, Albritton & Herbert

[57] ABSTRACT

A magnetic latch for holding a head positioner assembly within a disc drive system. The disc drive system has a head positioning apparatus located within a housing for positioning a plurality of read/write heads relative to a recording media within the housing. The head positioning assembly carries a voice coil motor for precisely controlling the movements of the head positioner assembly. The magnetic latch is positioned within a bumper stop that limits the head positioners movement to hold the head positioner assembly in an orientation where the heads can be effectively parked without damaging the recording media.

7 Claims, 4 Drawing Sheets

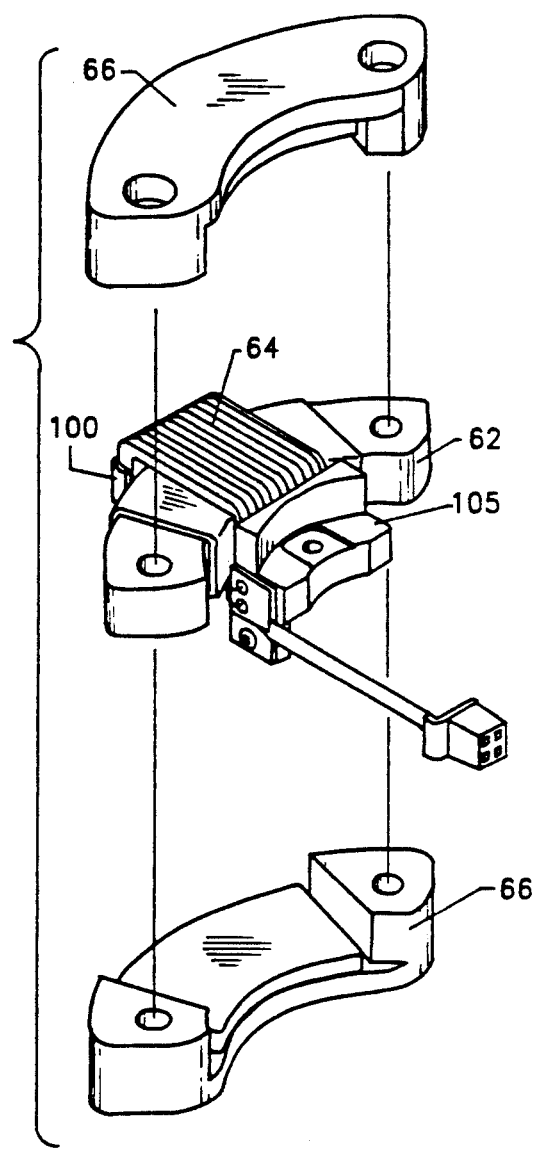
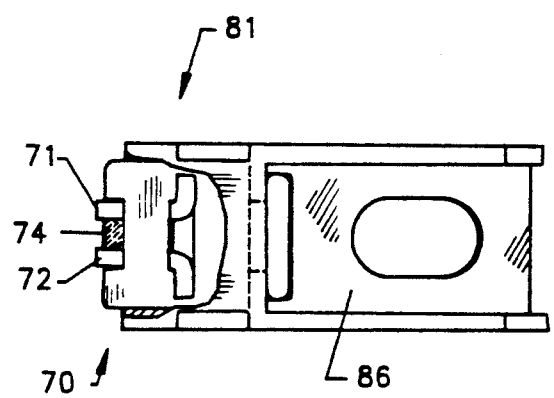
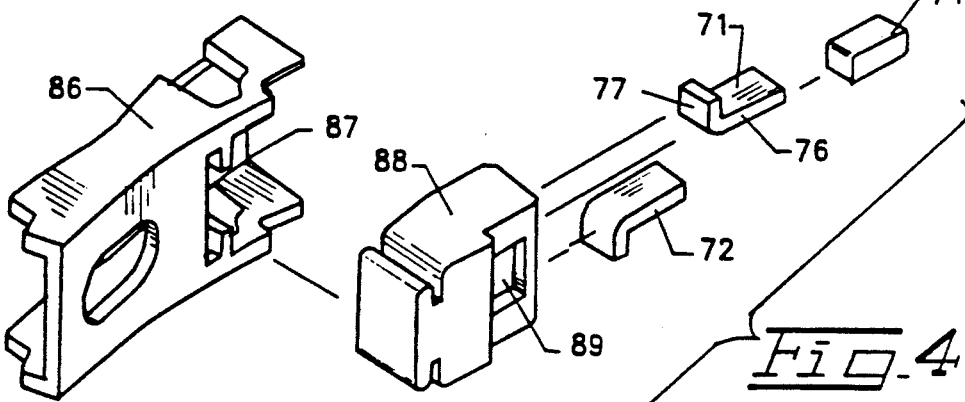

CRASH STOP AND MAGNETIC LATCH FOR A VOICE COIL ACTUATOR

This is a continuation of application Ser. No. 07/563,424 filed Aug. 7, 1990, now abandoned, which is a continuation of application Ser. No. 454,191 filed Dec. 21, 1989, now U.S. Pat. No. 4,947,274 which is a continuation of application Ser. No. 220,329 filed Jul. 18, 1988 now U.S. Pat. No. 4,890,176.

The present invention relates generally to an improved latching arrangement for head positioner assemblies within information storage systems such as disc drives. More particularly, the invention relates to a magnetic latch for securing rotatable head positioner assemblies in place when the disc drives is not in use.

BACKGROUND OF THE INVENTION

Disc drive machines record and reproduce information on a recording media. The media generally takes the form of circular information storage discs having a multiplicity of concentric tracks. Conventional Winchester type disc drives include a plurality of vertically aligned rotating information storage discs, each having at least one associated magnetic head that is adapted to transfer information between the disc and an external system. Each head is carried by an elongated flexure arm. The flexure arms are vertically aligned and are each attached to a common head positioner assembly. The head positioner assembly is adapted to move the heads back and forth in unison across the face of the vertically aligned discs. The head positioner assembly may be either rotationally mounted, or may take the form of a linear carriage that is free to move back and forth along a single axis. In rotary mounted head positioner assemblies, a voice coil motor rotates the head positioner assembly about a pivot mechanism to precisely position the heads relative to the magnetic discs.

Due to the precise positioning requirements of the read/write heads, the head positioner assembly must be finely balanced and the pivot mechanism must offer high precision and reliability in order to minimize undesirable vibrations within the drive. New drives constantly push for higher access speed and more memory storage within a confined space. In high speed compact disc drives, such as the 3½ inch drives now becoming popular, if any of the drive's components have primary resonant frequencies under approximately 5 Khz, mechanical movement within the drive will occasionally excite the resonant frequencies during normal operation which can limit the drives performance and/or generate undesirable noise which gives the appearance of an inferior quality product.

When the disc drive is not in use, it is important to "park" the heads in a position where they will not either mechanically or electrically interfere with the information storage media. The head positioner assembly must be held in place even when the drive is dropped, struck or otherwise mishandled. To hold the drive positioner assembly (and thus the heads) in place while the drive is not in use, a latching arrangement is typically provided. One common latching arrangement utilizes a selectively actuatable solenoid to hold the head positioner assembly in place, however, such systems have several drawbacks including the need for supporting electronics, relying on moving parts, occupying large spaces and/or detracting from the balance of the head positioner assembly.

SUMMARY OF THE INVENTION

Accordingly, it is a primary objective of the present invention to provide an effective head positioner assembly latching arrangement that has a low part count and is easy to assemble at low costs.

Another objective is to provide a latching arrangement that does not effect the balance of the head positioner assembly.

Another objective of the invention is to provide a magnetic latching for a head positioner assembly.

To achieve the foregoing and other objects and in accordance with the purpose of the present invention, a magnetic latch is provided for a disc drive system having a head positioning assembly for positioning a plurality of transducer heads relative to a recording media located within a disc housing. The magnetic latch includes a bumper stop, a strike plate and magnet means. The bumper stop limits the head positioning assembly's movement in one direction. The magnet means is carried by the bumper stop for magnetically engaging the strike plate to latch the head positioner assembly against the bumper stop when the drive is not in use, the magnet means including a slidable element that is slidably coupled to the bumper stop to insure that strike plate, which is formed of a magnetic material, is carried by the head positioner assembly.

BRIEF DESCRIPTION OF THE DRAWINGS

The features of the present invention that are believed to be novel are set forth with particularly in the appended claims. The invention, together with further objects and advantages thereof, may best be understood by reference to the following description taken in conjunction with the accompanying drawings in which:

FIG. 3 is an exploded perspective view of a voice coil motor suitable for driving a rotary head positioner assembly.

FIG. 4 is an exploded perspective view of a magnetic latch fabricated in accordance with the present invention.

FIG. 5 is a back view of the magnetic latch shown in FIG. 4.

DETAILED DESCRIPTION OF THE DRAWINGS

Figure 1:
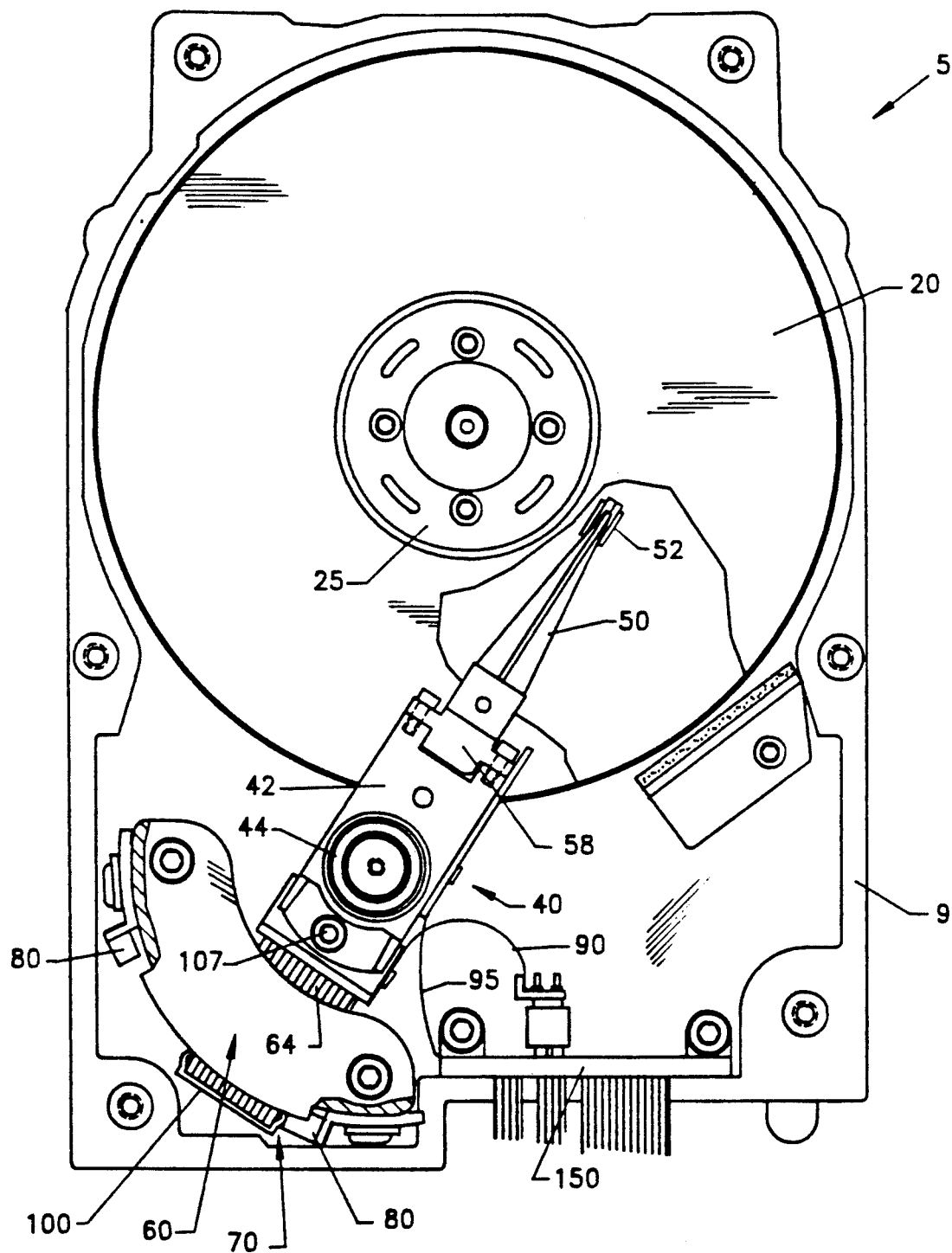
FIG. 1 is a top view of a disc drive that incorporates the present invention with its upper casing removed.
Figure 2:
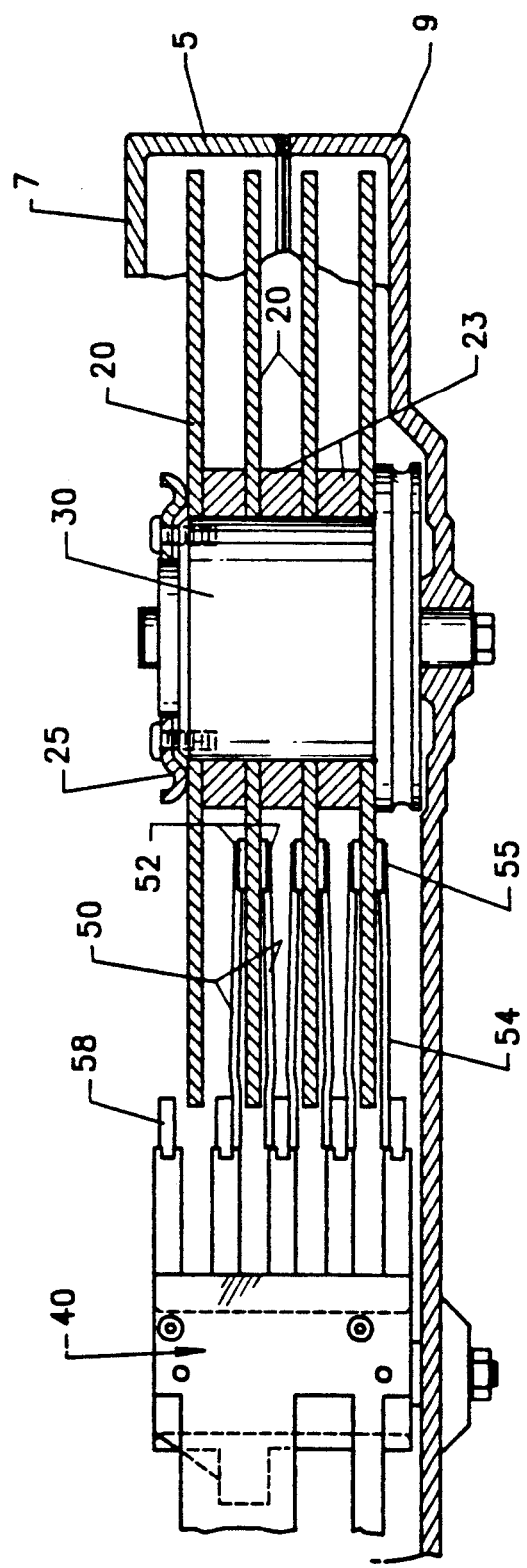
FIG. 2 is a side view of the disc drive shown in FIG. 1.

Referring first to FIGS. 1 and 2, a rotary disc drive system suitable for incorporating the teaching of the present invention is shown in diagrammatic form. A plurality of magnetic information storage discs 20 are journaled about a spindle motor assembly 30 within a housing 5 having upper and lower casing members 7 and 9 respectively. Each magnetic disc 20 has a multiplicity of concentric circular information storage tracks for recording information. Spacers 33 are disposed between adjacent information storage discs 20 to maintain their spacing and a disc clamp 25 positioned above the top information storage disc 21 firmly secures the magnetic discs 20 the spindle motor assembly 30.

A head positioner assembly 40 includes a pivot housing 42 that is rotationally coupled between the upper and lower casing 7,9 in one corner of the housing 5 by pivot bearing 44. The head positioner assembly 40 carries a plurality of head arm flexures 50 that each carry a magnetic read/write head 52 for reading information from and writing information onto the magnetic discs 20. The head positioner assembly 40 also carries a servo arm 54 which carries a servo head 55 for accurately positioning the magnetic heads 52 relative to the information storage tracks. The head and servo arms are each attached to the head positioner assembly 40 by individual flexural mounts 58. A voice coil motor 40 is adapted to precisely rotate the head positioner assembly back and forth such that the magnetic and servo heads move together across the magnetic discs. A magnetic latch 70 holds the head positioner assembly in place when the disc drive is not in use. The rotational movements of the pivot housing 42 are limited by bumper stops 80 which are disposed directly behind the voice coil motor 60.

The head positioner assembly 40 includes a pivot housing 42 that is journaled about pivot mechanism 44. The pivot housing is somewhat E shaped and has a plurality of forwardly extending vertically aligned platforms that each form a mounting base for a single flexure mount 58. The coil 64 for voice coil motor 60 is attached to the back side of the pivot housing 42 by a single center screw 107. To minimize weight at a reasonable cost, the pivot housing 42 is fabricated from aluminum. As can be appreciated by reference to FIG. 1, in the preferred embodiment, the pivot housing 42 as well as almost everything it carries are symmetrical about its longitudinal axis. The symmetry is desirable to precisely balance the head positioning assembly, which reduces undesirable internal vibrations.

A 32 pin connector 150 serves as the communications port between the disc drive and an external computer system. Two printed circuit cables (PCCs) are coupled between the connector 150 and the pivot housing 42. Electrical communications between the disc controller and the voice coil motor 60 are made over a drive PCC 90. Communications between the data and servo heads 52, 55 and the system controller are made over a read/write PCC 95. To more closely mechanically balance the head positioner assembly, drive PCC 90 and read/write PCC 95 are crossed such that they bias the pivot housing 42 in opposite directions, thereby reducing the parasitic torque on the system. The crossed nature of the printed circuit cables also reduces noise generated from electrical interference between the cables.

Referring next to FIG. 3, the voice coil motor 60 includes a center pole 62 having coil 64 journaled thereabout in a spaced apart relation. Outer poles 66 are sandwiched over the top and bottom sides of the coil 64 and are sizes so as to allow coil 64 to move freely back and forth over the inner pole within the confines set by bumper stops 80. The outer poles are identical in construction.

A strike plate 100 is mounted to the back side of coil 64. The strike plate forms a contact surface for both magnetic latch 70 and bumper stops 80. Since the strike plate 100 is the contact surface for the magnetic latch, it must be formed of a magnetic material such as magnetic stainless steel. A support member 105 is coupled to the front surface of coil 64 to form an attachment plate for the pivot housing 42. The pivot housing may be firmly secured to the support member 105 via screw 107. Strike plate 100 and support member 105 may be bonded to the coil using a suitable epoxy.

When the disc drive is not in use, it is important to park the heads in a position where they will not either mechanically or electrically interfere with the information storage media. The head positioner assembly must be held in place even when the drive is dropped, struck or otherwise mishandled. To hold the head positioner assembly (and thus the heads) in place while the drive is not in use, a magnetic latch 70 is provided in one of the bumper stops 80 that limit the rotational movements of the head positioner assembly. Specifically, the inner bumper stop 81 is positioned such that when strike plate 100 rests against it, the heads will be located adjacent the spindle motor assembly 30 spaced apart from the spacers 23 that are journaled about the spindle motor assembly. The second bumper stop 82 is positioned such that the heads will be outside of the outermost information storage track on the discs 20 when strike plate 100 rests against bumper stop 82.

Figure 6:
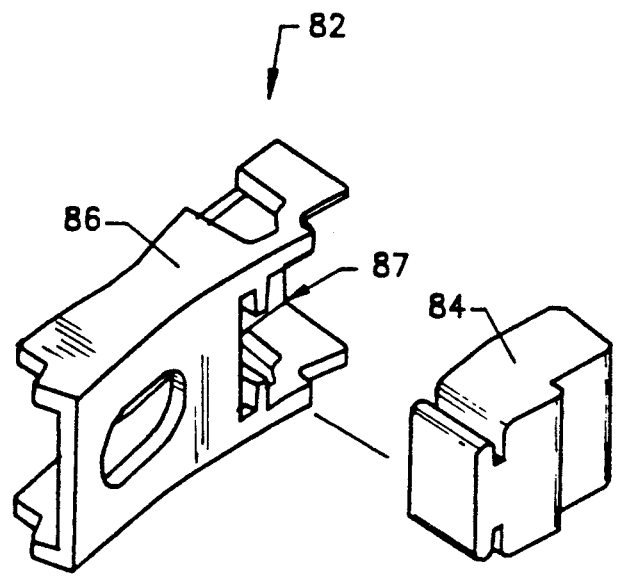
FIG. 6 is an exploded perspective view of a bumper stop.
Figure 7:
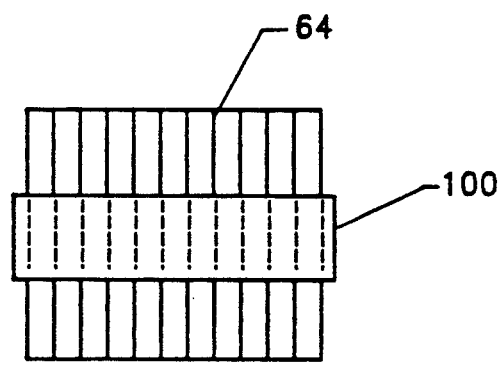
FIG. 7 is an end view of the coil and strikeplate for the voice coil motor shown in FIG. 3.

Referring next to FIG. 6, bumper stop 82 includes bumper pad 84 disposed within a frame 86 that is securely fastened to the lower casing 9. The bumper pad is formed from a resilient material such as rubber and is press fit into a recess 87 within the frame 86. The leading edge of the bumper pad 84 forms its contact surface 85. Referring to FIG. 7, strike plate 100 which comes into contact with bumper stop 82 is mounted to the front face of coil 64.

Referring next to FIGS. 4 and 5, the embodiment of the magnetic latch chosen for the purpose of illustration will be described. The magnetic latch 70 includes upper and lower magnetic poles 71 and 72 respectively that are disposed about magnet 74. Poles 71 and 72 are substantially "L" shaped, having an extended portion 76 and a catch portion 77. The magnet 74 is rectangular. The poles extend slightly beyond the magnet 74 to prevent the magnet from being hit by strike plate 100. It should be appreciated that the poles are independently slidable so that they can readily engage strike plate 100 without any air gaps when the strike plate is in contact with the magnetic latch 70.

The bumper stop 81 is virtually identical to bumper stop 82 except that the bumper pad 88 within bumper stop 81 has a recess 89 therein. The magnetic latch 70 is placed within the recess 89 in bumper pad 88 such that the extended portions of poles 71 and 72 extend beyond the contact surface 85 of bumper pad 88. The poles 71, 72, as well as the magnet 74 are loosely placed within the recess 89 with the catch portions 77 of the poles being arranged to limit the distance the poles can slide relative to the bumper stop to prevent the magnetic latch from slipping out of the bumper stop. Since the poles are not connected together, they may slide independently relative to the bumper stop.

It will be appreciated that the voice coil motor 60 must be designed to generate sufficient torque to pull the strike plate 100 away from the magnetic latch 70. The magnet chosen as magnet 74 preferably has a magnetic field with a very flat profile. This is desirable to minimize the effect that the latch has on the head positioner assembly when the heads are positioned over the information storage discs. By way of example, a suitable design strength for the magnetic lath is one in which the latch will withstand a 70 g shock pulse sustained diagonally across the drive.

In operation, the head positioner assembly will rest in a "home" position wherein magnetic latch 70 firmly hold the pivot housing in place. When a command is received to access the disc, the voice coil motor is activated to pull the strike plate away from the magnetic latch and position the heads as directed. After the requested functions have been executed, the head positioner assembly is returned to the home position until further directions are received.

The described latching structure has several advantages. Primarily it allows the pivot housing to be symmetrically balanced. An evenly balanced head positioner assembly is very important to high speed discs.

Although only one embodiment of the present invention has been described herein, it should be understood that the present invention may be embodied in many other specific forms without departing from the spirit and scope of the invention. Particularly, it should be appreciated that the actual configuration of the various disc drive components may be widely varied. The construction of the magnetic latch as well as its integration into the bumper stop may be widely varied as well. Therefore, the present examples and embodiments are to be considered as illustrative and not restrictive, and the invention is not to be limited to the details given herein, but may be modified within the scope of the appended claims.

We claim:

1. A disc drive system comprising:
   a magnetic transducer head;
   a magnetic recording media;
   a rotary head positioner assembly for positioning the transducer head relative to the recording media;
   bumper stop means for limiting the head positioner assembly's movement in one direction;
   a striker member formed of a magnetic material connected to the head positioner assembly; and
   wherein the bumper stop means further comprises magnet means for magnetically engaging the striker to latch the head positioner assembly against the bumper stop when the drive is not in use.

2. A magnetic latch for a disc drive system having a rotary head positioner assembly for positioning at least one transducer head relative to a recording media located within a disc housing, the head positioner assembly being movable with respect to the disc housing, the magnetic latch including:
   a bumper stop fixably mounted to the housing for limiting the head positioner assembly's movement in one direction;
   a striker formed of a magnetic material connected to the head positioner assembly; and
   magnet means connected to the bumper stop for magnetically engaging the striker to latch the head positioner assembly against the bumper stop when the drive is not in use.

3. A magnetic latch as recited in claim 2 wherein said striker is an elongated member.

4. A magnetic latch as recited in claim 2 further comprising a compliant element which prevents the striker from hitting the magnet.

5. A magnetic latch for a disc drive system having a rotary head positioner assembly for positioning at least one transducer head relative to a recording media located within a disc housing, the head positioner assembly being movable with respect to the disc housing, the magnetic latch comprising:
   an elongated striker member formed of a magnetic material incorporated into the head positioner assembly; and
   engagement means for magnetically engaging the striker to latch the head positioning assembly when the drive is not in use.

6. A magnetic latch as recited in claim 5 wherein said engagement means comprises:
   a bumper stop connected to the housing for limiting the head positioner assembly's movement in one direction; and
   a magnet connected to the bumper stop which magnetically engages the striker to latch the head positioner assembly against the bumper stop.

7. A magnetic latch as recited in claim 6 further comprising a compliant element which prevents the striker from hitting the magnet.

* * * * *